United States Patent
Zou et al.

(10) Patent No.: US 9,398,630 B2
(45) Date of Patent: Jul. 19, 2016

(54) METHODS AND APPARATUSES FOR CONTROLLING AND SCHEDULING DEVICE-TO-DEVICE COMMUNICATIONS

(75) Inventors: Jialin Zou, Randolph, NJ (US); Subramanian Vasudevan, Morristown, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 59 days.

(21) Appl. No.: 13/571,725

(22) Filed: Aug. 10, 2012

(65) Prior Publication Data
US 2014/0044024 A1    Feb. 13, 2014

(51) Int. Cl.
*H04W 76/02* (2009.01)
*H04W 72/04* (2009.01)
*H04W 76/04* (2009.01)

(52) U.S. Cl.
CPC .......... *H04W 76/023* (2013.01); *H04W 72/042* (2013.01); *H04W 76/043* (2013.01)

(58) Field of Classification Search
CPC .......... H04W 72/2446; H04W 72/048; H04W 72/0486; H04W 72/12
USPC ............................ 370/329, 310.2, 332, 280
See application file for complete search history.

(56) References Cited

U.S. PATENT DOCUMENTS

| | | | |
|---|---|---|---|
| 6,259,927 B1* | 7/2001 | Butovitsch et al. | 455/522 |
| 7,515,927 B2 | 4/2009 | Das et al. | |
| 7,548,760 B2 | 6/2009 | Vasudevan et al. | |
| 8,520,575 B2* | 8/2013 | Doppler et al. | 370/310 |
| 8,655,338 B2* | 2/2014 | Kim et al. | 455/418 |
| 2009/0060063 A1* | 3/2009 | Guey | H04L 25/023 375/260 |
| 2009/0196275 A1* | 8/2009 | Damnjanovic et al. | 370/345 |
| 2011/0098043 A1* | 4/2011 | Yu et al. | 455/435.1 |
| 2011/0170431 A1* | 7/2011 | Palanki et al. | 370/252 |

(Continued)

FOREIGN PATENT DOCUMENTS

| | | |
|---|---|---|
| JP | 2008510344 A | 4/2008 |
| JP | 2010504052 A | 2/2010 |

(Continued)

OTHER PUBLICATIONS

Pradap, K.V. et al : "Uplink Buffer Status Reporting for Delay Constrained Flows in 3GPP Long Term Evolution"; Wireless Communications and Networking Conference, 2009, WCNC 2009, IEEE, pp. 1-6; Apr. 5-8, 2009.*

(Continued)

*Primary Examiner* — Joseph Bednash
(74) *Attorney, Agent, or Firm* — Harness, Dickey & Pierce, P.L.C.

(57) ABSTRACT

At least one example embodiment discloses a method of controlling direct user equipment communications. The method includes receiving reports from a first user equipment (UE) and a second UE, respectively, the first and second UEs communicating with a serving base station, determining at least one control channel and at least one data channel for a direct communication between the first UE and the second UE, allocating at least one resource block for the direct communication link between the first UE and the second UE based on the determining and transmitting a configuration message to the first UE and the second UE, the configuration message indicating the allocated resource block and permitting at least one of the first UE and the second UE to determine parameters of the direct communication link.

19 Claims, 6 Drawing Sheets

(56) References Cited

U.S. PATENT DOCUMENTS

| | | | |
|---|---|---|---|
| 2011/0275382 A1 | 11/2011 | Hakola et al. | |
| 2011/0280205 A1* | 11/2011 | Qin et al. | 370/329 |
| 2012/0093098 A1* | 4/2012 | Charbit et al. | 370/329 |
| 2012/0106517 A1* | 5/2012 | Charbit et al. | 370/336 |
| 2012/0243431 A1* | 9/2012 | Chen et al. | 370/252 |
| 2013/0223353 A1* | 8/2013 | Liu et al. | 370/329 |
| 2013/0242884 A1* | 9/2013 | Ekici | 370/329 |
| 2013/0322345 A1 | 12/2013 | Vasudevan et al. | |
| 2013/0336230 A1 | 12/2013 | Zou et al. | |
| 2014/0038653 A1* | 2/2014 | Mildh et al. | 455/501 |
| 2014/0321314 A1* | 10/2014 | Fodor et al. | 370/252 |

FOREIGN PATENT DOCUMENTS

| | | |
|---|---|---|
| JP | 2012514435 A | 6/2012 |
| JP | 2013523018 A | 6/2013 |
| JP | 2013530570 A | 7/2013 |
| WO | WO-2010007498 A1 | 1/2010 |
| WO | WO 2011/069295 | 6/2011 |
| WO | WO 2011/109941 | 9/2011 |
| WO | WO-2011130626 A1 | 10/2011 |
| WO | WO-2011132818 A1 | 10/2011 |
| WO | WO-2011158141 A1 | 12/2011 |
| WO | WO 2012/049351 | 4/2012 |
| WO | WO 2012/073846 | 6/2012 |

OTHER PUBLICATIONS

International Search Report dated Nov. 4, 2013.

International Preliminary Report on Patentability (PCT/IB/326 and PCT/IB/373) for corresponding International application No. PCT/US2013/053730 dated Feb. 19, 2015.

* cited by examiner

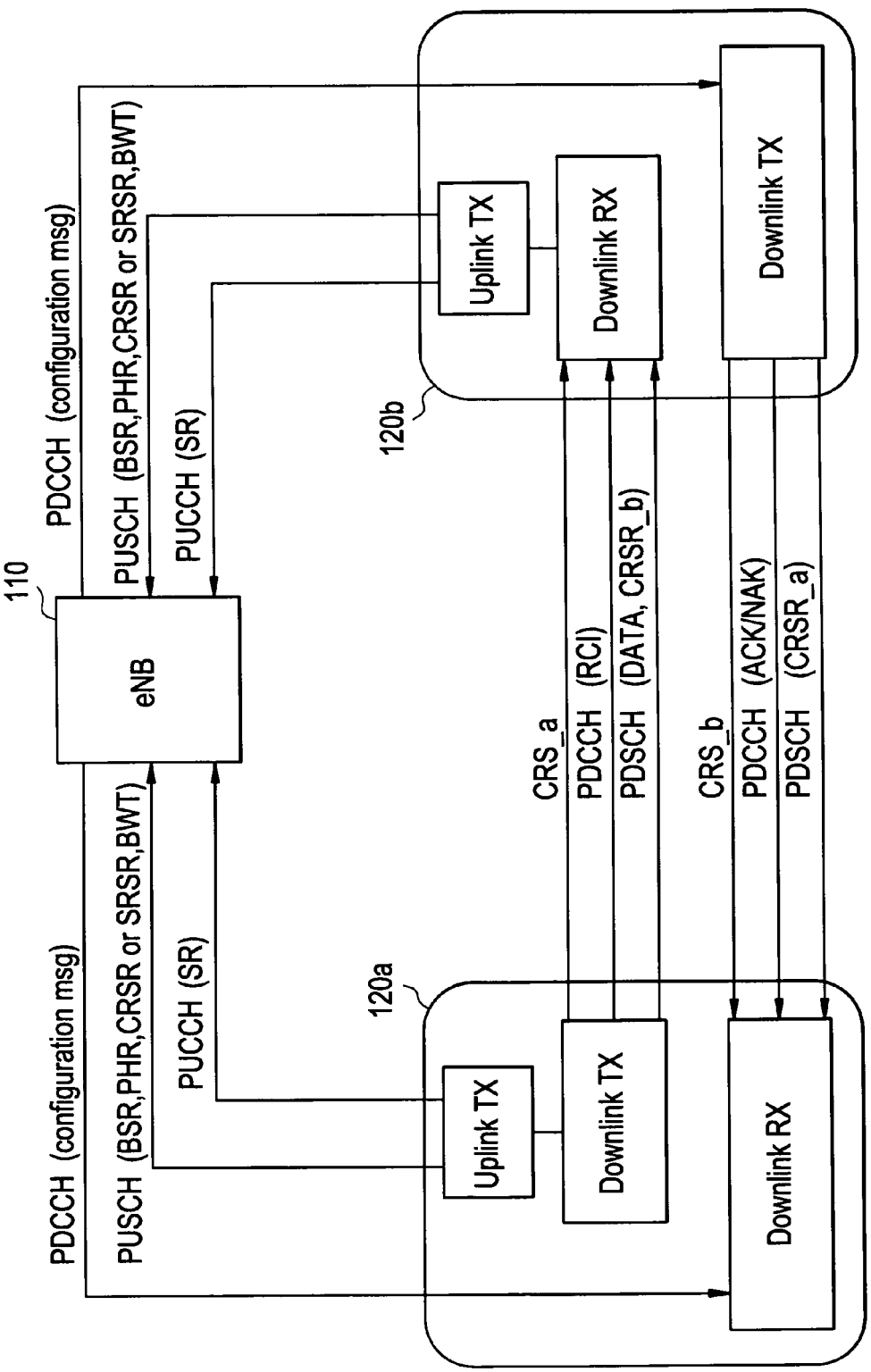

METHODS AND APPARATUSES FOR CONTROLLING AND SCHEDULING DEVICE-TO-DEVICE COMMUNICATIONS

BACKGROUND

In device-to-device communications, user equipments (UEs) communicate with each other. Conventional UEs are equipped to transmit on the uplink and receive on the downlink, while base stations receive on the uplink and transmit on the downlink. Device-to-device communication may be used for at least public safety and social networking.

To improve public safety, device-to-device communication is used where the cellular infrastructure is unavailable. Device-to-device communication allows user equipments (UEs) to communicate with each other directly in emergency situations.

Device-to-device communication is also used in social networking for commercial applications. More specifically, device-to-device communication allows proximate UEs to share information.

SUMMARY

In cellular network controlled device-to-device communications, direct device-to-device communications are fully controlled and scheduled by a serving base station (e.g., enhanced NodeB (eNB)). The network controlled device-to-device system uses signaling exchanges between the eNB and the UEs and the device-to-device communications are dependent on the network. This is different from the approach for public safety which requires device-to-device communication to still work without the involvement of the cellular network.

The inventors have developed a loosely (relaxed) controlled device-to-device communication system which allows control functions to be performed by the UEs in device-to-device communications. The loosely (relaxed) controlled device-to-device communication system uses less signaling between a serving base station and the UEs and provides flexibility for UEs while managing uplink interference.

At least one example embodiment discloses a method of controlling direct user equipment communications. The method includes receiving reports from a first user equipment (UE) and a second UE, respectively, the first and second UEs communicating with a serving base station, determining at least one control channel and at least one data channel for a direct communication between the first UE and the second UE, allocating at least one resource block for the direct communication link between the first UE and the second UE based on the determining and transmitting a configuration message to the first UE and the second UE, the configuration message indicating the allocated resource block and permitting at least one of the first UE and the second UE to determine parameters of the direct communication link.

In an example embodiment, the method further includes receiving requests for direct communication from the first and second UEs, respectively, determining that the first UE and the second UE are candidates for direct communication and notifying the first UE and the second UE that the first UE and the second UE are candidates for direct communication based on the determining that the first UE and the second UE are candidates for direct communication, the receiving reports being based on the notifying.

In an example embodiment, the allocating at least one resource block allocates at least one of a device-to-device link control channel in the structure of a physical downlink control channel and a device-to-device link data channel in the structure of a physical downlink shared channel for the direct communication link.

In an example embodiment, each report includes a buffer status report (BSR), a power headroom report (PHR) and a sounding reference signal report (SRSR) for the respective first or second UE.

In an example embodiment, the method further includes determining a time-division duplex (TDD) transmission duty cycle for the direct communication link based on the received reports.

In an example embodiment, the method further includes determining a hybrid automatic repeat request configuration for the direct communication link based on the received reports.

In an example embodiment, the method further includes determining an initial transmitting power for at least one of the first and second UEs on the direct communication link based on the received reports.

In an example embodiment, the method further includes determining a maximum transmitting power for at least one of the first and second UEs on the direct communication link based on the received reports.

In an example embodiment, the method further includes determining a time period for the first UE and the second UE to communicate using the at least one resource block.

In an example embodiment, the determining a time period determines the time period based on the BSR, a bandwidth available over the direct communication link, a transmission power and transmission rate over the direct communication link.

In an example embodiment, the allocating allocates the at least one resource block based on other UEs communicating with the first base station and locations of the other UEs.

At least one example embodiment discloses a first user equipment (UE) including an uplink transmitter configured to transmit communications to a base station, a downlink transmitter configured to communicate with a second UE over an allocated downlink block and a downlink receiver configured to receive communications from the base station.

In an example embodiment, the downlink receiver is further configured to receive communications from the second UE.

In an example embodiment, the first UE is configured to determine a transmitting power for communicating with the second UE.

In an example embodiment, the downlink receiver is configured to receive synchronization reference signals from the base station to maintain synchronization.

At least one example embodiment discloses a method for offloading communications of a first base station. The method includes receiving, by a first user equipment (UE), a configuration message, the configuration message indicating at least one allocated resource block for a direct communication link between the first UE and the second UE and permitting at least one of the first UE and the second UE to determine parameters of the direct communication link and communicating with the second UE using the at least one resource block.

In an example embodiment, the communicating includes transmitting receive control information to the second UE.

In an example embodiment, the method further includes transmitting data to the second UE with the receive control information.

In an example embodiment, the method further includes receiving an acknowledgement indicating whether the data was transmitted successfully.

In an example embodiment, the communicating includes determining a transmission power over the direct communication link and transmitting data to the second UE at the determined transmission power.

In an example embodiment, the communicating includes transmitting a pilot signal to the second UE receiving a response from the second UE, the response indicating a link condition, the determining the transmission power being based on the link condition.

In an example embodiment, the method further includes transmitting a request to the second UE and at least another UE, the request requesting statuses of the second UE and the at least another UE, respectively, receiving status reports from the second UE and the at least another UE, respectively, and determining parameters for communicating with the second UE and the at least another UE based on the received status reports.

In an example embodiment, the status reports include a buffer status report (BSR), a buffered waiting time (BWT), a power headroom report (PHR) and a common reference signal report (CRSR) for the second UE and the at least another UE, respectively.

In an example embodiment, the determining parameters schedules transmission time slots for each of the second UE and the at least another UE based on the received status reports.

BRIEF DESCRIPTION OF THE DRAWINGS

Example embodiments will be more clearly understood from the following detailed description taken in conjunction with the accompanying drawings. FIGS. 1-6B represent non-limiting, example embodiments as described herein.

FIG. 1 illustrates a network in which example embodiments are implemented;

FIGS. 2-3 illustrate a method of controlling direct user equipment communications of a first base station according to an example embodiment;

FIG. 4 illustrates a call flow of the method described in FIGS. 2-3, according to an example embodiment;

FIG. 5 illustrates a system and channel structure of loosely controlled device-to-device communications according to an example embodiment;

FIG. 6B illustrates an example embodiment of a base station.

DETAILED DESCRIPTION

Figure 1:
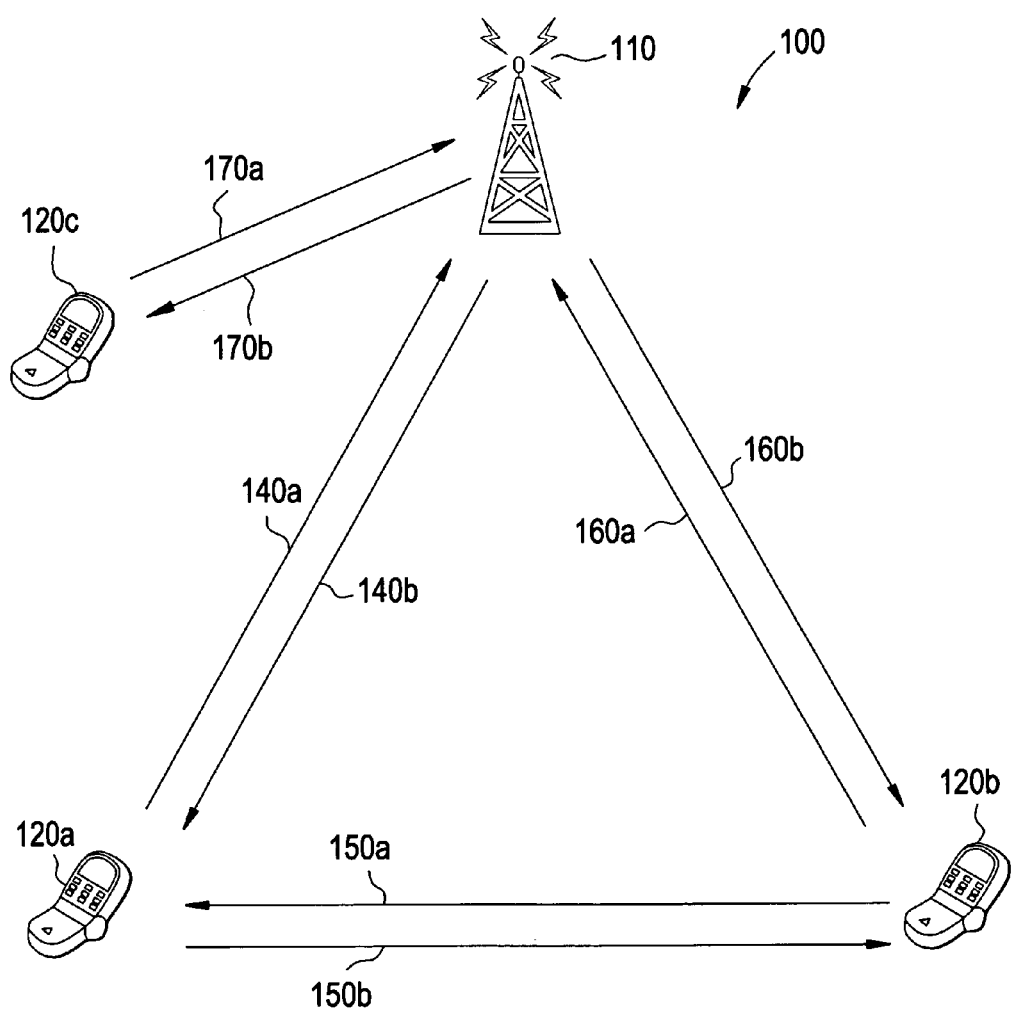

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

As disclosed herein, the term "storage medium", "storage unit" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "user equipment" or "UE" may be synonymous to a user equipment, mobile station, mobile user, access terminal, mobile terminal, user, subscriber, wireless terminal, terminal and/or remote station and may describe a remote user of wireless resources in a wireless communication network. Accordingly, a UE may be a wireless phone, wireless equipped laptop, wireless equipped appliance, etc.

The term "base station" may be understood as a one or more cell sites, base stations, nodeBs, enhanced NodeBs, access points, and/or any terminus of radio frequency communication. Although current network architectures may consider a distinction between mobile/user devices and access points/cell sites, the example embodiments described hereafter may also generally be applicable to architectures where that distinction is not so clear, such as ad hoc and/or mesh network architectures, for example.

Communication from the base station to the UE is typically called downlink or forward link communication. Communication from the UE to the base station is typically called uplink or reverse link communication.

Serving base station may refer to the base station currently handling communication needs of the UE.

The term "channel" may be understood as any combination of frequency band allocation, time allocation and code allocation.

Example embodiments disclose device-to-device communications which occur over a direct communications link.

UEs requesting device-to-device communications determine a viability of a direct communications link. After the viability of the direct communications link has been confirmed by the UEs with a link status report, a serving base station (e.g., eNB) performs an initial configuration of the direct communications link including an initial TDD duty cycle, hybrid automatic repeat request (HARQ) configuration, maximum allowed device-to-device communication time, initial transmission power and maximum allowed resource allocation (PRB). The initial TDD slot assignment and HARQ configuration is determined by a serving base station based on traffic characteristics.

The relaxed network control and scheduling allow the UEs to perform more control functions. Dedicated control channels are employed in the direct communications link. In one example embodiment, the structure and format of Long Term Evolution (LTE) downlink channels are used for the direct communications link. The transmitting UE in the device-to-device communications will deliver Reception Control Information (RCI) to the receiving UE via a control channel to assist demodulation/decoding at a receiving UE. The UEs will transmit ACK/NAK after a delay at a transmitting slot assigned to the UE at which the UE transmits data and a reference signal measurement.

FIG. 1 illustrates a network in which example embodiments are implemented. As shown in FIG. 1, a network 100 includes a base station 110 and UEs 120a, 120b and 120c. The base station 110 may be an enhanced Node-B (eNB), for example. The base station 110 may serve a geographic area known as a cell.

In LTE systems, transmission and receiving are frequency duplexed. The uplink is orthogonal frequency division multiplexed with different users being allocated time-frequency blocks known as physical resource blocks (PRBs). In the example embodiment shown in FIG. 1, the base station 110 schedules UEs 120a, 120b and 120c, as well as any other UEs in the system (not shown), to transmit data on these PRBs on an uplink traffic channel known as the Physical Uplink Shared Channel (PUSCH). UEs 120a, 120b, and 120c, and other UEs of the system, transmit feedback and control information on Physical Uplink Control Channel (PUCCH). Feedback and control information may include, for example, downlink transmission acknowledgments and downlink channel quality feedback. There may be full resource re-use across cells such that PRBs may be re-used in adjacent geographic cells (not shown).

Each UE 120a, 120b and 120c communicates with the base station 110 via pairs of bi-directional communication links 140a/140b, 160a/160b, and 170a/170b, respectively. Each of the bi-directional links includes an uplink 140a, 160a, 170a and a downlink 140b, 160b and 170b.

The downlinks 140b, 160b and 170b are channels from the base station 110 to the UEs 120a, 120b, and 120c, respectively. The base station 110 transmits on the downlinks 140b, 160b, and 170b and the UEs 120a, 120b and 120c receive on the downlinks 140b, 160b, and 170b, respectively.

The uplinks 140a, 160a, and 170b are channels from the UEs 120a, 120b, and 120c to the base station 110. The UEs 120a, 120b and 120c transmit on the uplinks 140a, 160a, and 170a respectively, and the base station 110 receives on the uplinks 140a, 160a and 170a.

In at least one example embodiment, UEs 120a and 120b further receive on a device-to-device channel (e.g., in the LTE downlink channel structure) 150a/150b in order to receive data from a UE peer in device-to-device communication. The base station 110 initially configures the UEs for device-to-device communications on the device-to-device channel 150a/150b. The base station 110 may allocates PRBs for communications between the base station and UEs, including the UEs in device-to-device communication, on the downlink channel. While the device-to-device channels are described as in the downlink channel format, it should be understood that uplink channel structure may be employed for device-to-device communication instead of downlink channels. Thus, example embodiments are not limited to using downlink channel format for device-to-device communication.

Each of the UEs 120a and 120b may perform a discovery method to discover UEs within a communication range. Alternatively, the base station 110 may initiate a discovery method to determine which UEs are within a communication range. If one of the UEs 120a and 120b discovers that the other UE is within the communication range, the one of the UEs 120a and 120b may request direct communication.

In FIG. 1, the UEs 120a and 120b are considered to be within a communication range of each other.

The discovery method may be performed in accordance with U.S. application Ser. No. 13/484,863, entitled "Method and Apparatus for Resource Allocation for Device-to-Device Communication," and U.S. application Ser. No. 13/523,521, entitled "Methods and Apparatus for Opportunistic Offloading of Network Communications to Device-to-Device Communication," the entire contents of each of which are herein incorporated by reference.

Because the UEs 120a and 120b are within a communication range, at least one of the UEs 120a and 120b transmits a request for direct communication to the base station 110 through the respective uplink 140a or 160a. In response to the request, the base station 110 allocates resources for a direct communication link 150a/150b between UE 120a and 120b. Device-to-device resources may be allocated according to at least the methods shown with respect to FIGS. 2-5, described below.

Furthermore, the UE 120c, which is in the vicinity of the peering UEs 120a and 120b can continue to communicate with the base station 110 since additional transmission occurs on the downlink from the base station 110.

The network 100 is an LTE network. However, it should be understood that example embodiments described herein may be performed in accordance with System for Mobile Communications (GSM), General Packet Radio Service (GPRS), Universal Mobile Telecommunications System (UMTS), High-Speed Downlink Packet Access (HSDPA), and/or High-Speed Uplink Packet Access (HSUPA) cellular standards.

Figure 2:
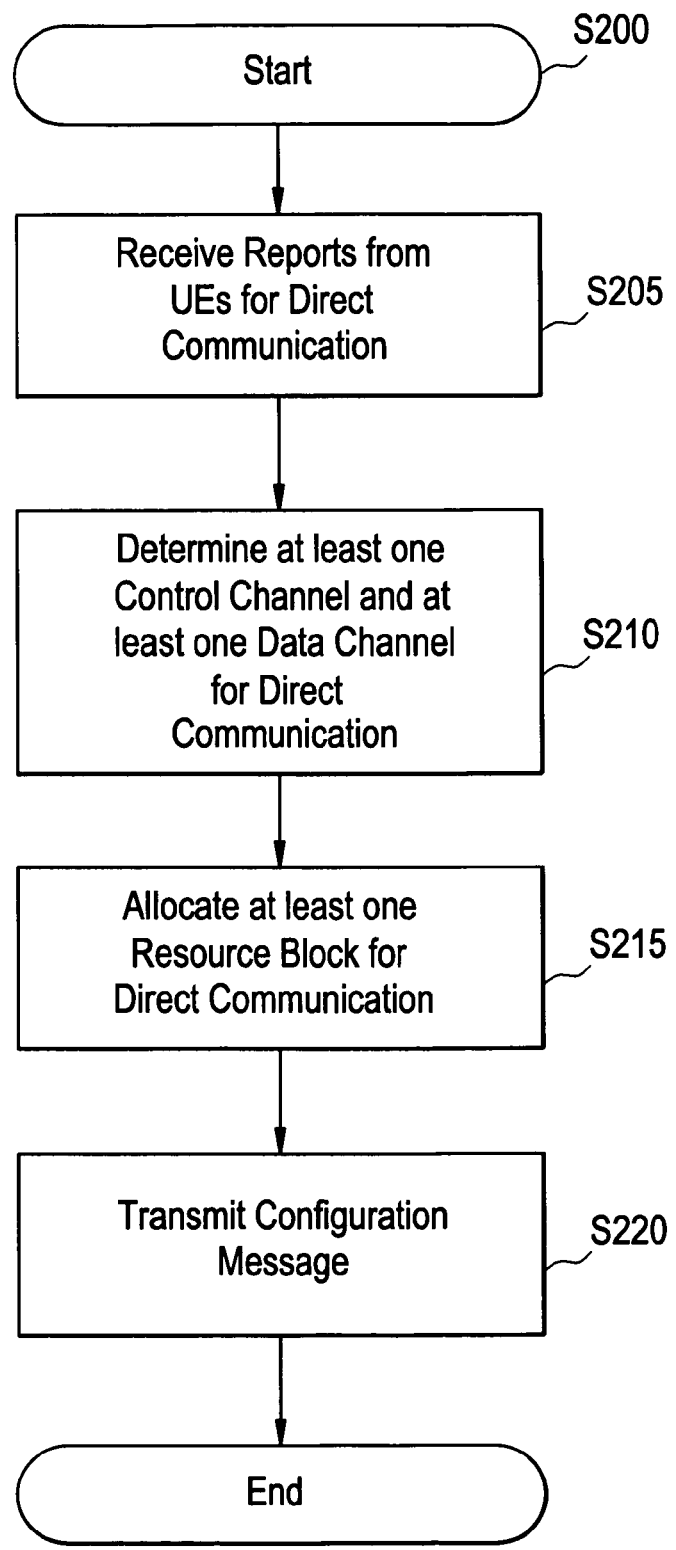
Figure 3:
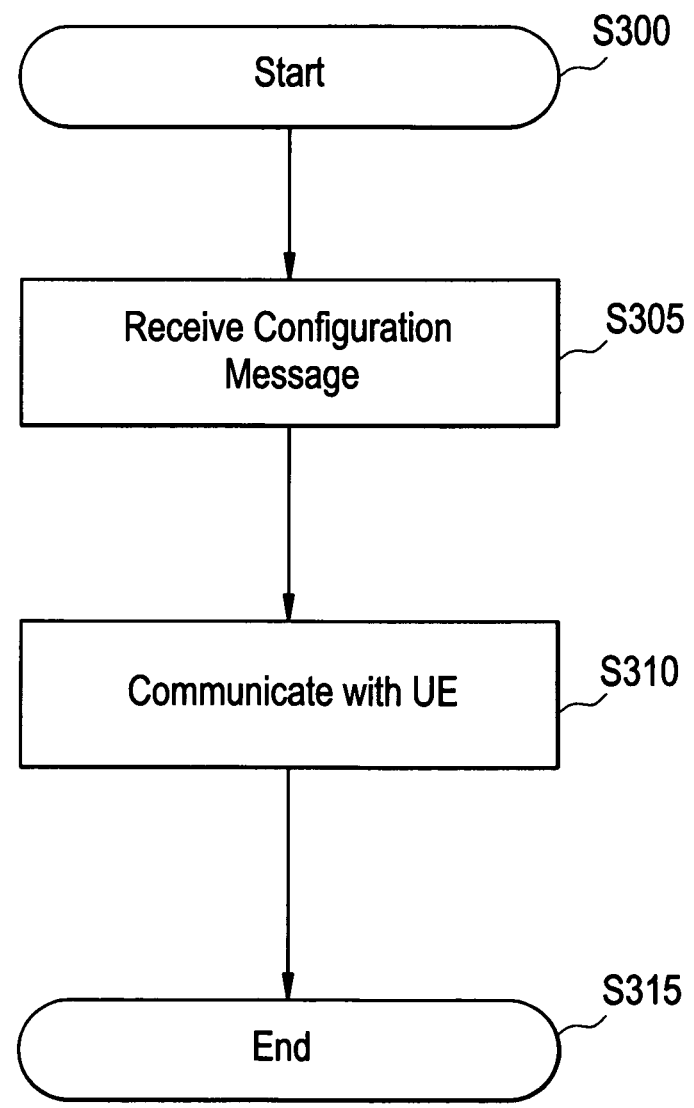

FIGS. 2-3 illustrate a method of controlling direct user equipment communications. The steps shown in FIG. 2 are performed by a serving base station such as the eNB 110 shown in FIG. 1. The steps shown in FIG. 3 are performed by a UE such as the UE 120a (first UE) shown in FIG. 1.

At S200, the method starts. The discovery method process of initiating a direct communications link may be performed in accordance with U.S. application Ser. No. 13/484,863, entitled "Method and Apparatus for Resource Allocation for Device-to-Device Communication," and U.S. application Ser. No. 13/523,521, entitled "Methods and Apparatus for Opportunistic Offloading of Network Communications to Device-to-Device Communication," the entire contents of each of which are herein incorporated by reference.

More specifically, at S200, the serving base station receives requests for direct communication from the first and second UEs, respectively, determines that the first UE and a second UE (e.g., UE 120b) are candidates for direct communication and notifies the first UE and the second UE that the first UE and the second UE are candidates for direction communication.

The serving base station notifies the first UE and the second UE by directing the UEs in the direct communication link to report an amount of data the first and second UEs expect to transfer over the direct link.

The UEs respond to this request by transmitting reports. At S205, the serving base station receives reports from the first and second UEs at S205. For example, in FIG. 1, the eNB 110 receives reports from UEs 120a and 120b.

Each initial report includes a buffer status report (BSR), a power headroom report (PHR) and a sounding reference signal report (SRSR) for the respective first or second UE. The BSR identifies the amount of data the respective first or second UE is to transfer over the direct communication link. After the UE direct communication is started, for the continuation of the device-to-device communication, the reports are collected through the direct link. The parameters include: BSR, PHR, common reference signal report (CRSR) which is measured from the reference signal (pilot) sending by the UEs, and buffer wait time report (BWTR) which is the waiting time of the buffered data since the oldest data arrived in the buffer. The BSR, PHR, BWTR, CRSR and SRSR may be collectively known as status information. The PHR, CRSR and SRSR may be collectively known as power measurement information. BSR, PHR and the signal format of CRS and SRS are known in the art and are defined in wireless standards. Therefore, for the sake of brevity, BSR, PHR and SRSR will not be described in greater detail.

Based on the received reports, the serving base station configures at least one control channel and at least one data channel which includes determining at least one control channel and at least one data channel for direct communication at S210. For example, the at least one control channel and the at least one data channel may be determined based on empirical data and set in the serving base station.

As will be described in greater detail below, a downlink control and data channel structure, and format of the existing LTE cellular system, may be used for the loosely controlled device-to-device mode.

In general, either an existing downlink channel structure or uplink channel structure may be used for the direct communication link for the loosely controlled device-to-device communications. Interference issues between the frequency-diverse downlink control channels used by multiple device-to-device pairs in close proximity are resolved through appropriate allocation of aggregation levels on these control channels. Furthermore, orthogonalization of these channel pairs using time offsets and partitioning of frequency resources into multiple carriers is not precluded.

At S215, the serving base station initially allocates at least one physical resource block (PRB) for the direct communication link between the first UE and second UE based on the at least one control channel and at least one data channel. At S215, the allocation of at least one PRB includes determining an initial transmission power, a maximum transmission power, a maximum allowed range of frequency resources (sub-carriers), a TDD transmission duty cycle, a transfer time for direct communication and a HARQ configuration.

The serving base station determines initial direct link configurations based on (i) the relative priority of the UEs traffic, and (ii) resource availability for UEs that are communicating with the serving base station. If the priority of the device-to-device traffic is high, more allowed resources will be arranged. Otherwise, less resources will be allowed for direct link. Similarly, if there are no other UEs, more resources could be allowed for direct communications. On the other hand, if there are a lot of other UEs, less resources could be allowed for the device-to-device communications.

Based on a traffic pattern of a specific application (whether the traffic is balanced in either direction or if one UE is to transmit more information than the other) and the buffer status reports from the UEs, the serving base station determines and configures the device-to-device TDD transmission duty cycle of the first and second UEs and the associated HARQ. Furthermore, a maximum transmission power cap is specified by the serving base station for each UE, which sets a limit on the power with which the UE is allowed to transmit over the direct communications. Examples of applications include voice, file transfer and email exchange.

Upon receiving the power measurement information (PHR, SRSR), the serving base station determines the initial transmission power. The initial power of a transmitting UE (e.g., first UE) in direct communications is based on its SRS measured/reported by the other UE, the UL interference level, and PHR. The initial CRS power of the receiving UE (e.g., second UE) is based on the level of the SRSR reported from the intended transmitting UE and the PHR of the intended receiving UE. SRS is the reference signal sending from UE to the eNB during normal operations. CRS is the reference signal sending from the eNB to the UE during normal LTE operations. After device-to-device communication is enabled, the UEs send pilots to each other. The signal format of the pilots is adopted from the CRS of the downlink.

A target SRS is determined by the serving base station based on an error rate requirement. With the known target SRS and PHR, the initial power of CRS is determined by scaling up or scale down the previous serving base station scheduled power. The maximum transmission power limit/cap is determined by the serving base station and sent to the transmitting UEs for limiting their transmission power.

The serving base station may initially determine the maximum transmission power based on the reported PHR and received SRS level which are determined by the locations of the first and second UEs, respectively. After the direct link is enabled, the power cap will be scaled by the level of Downlink CRS measurement at the UEs themselves. The closer the first and second UEs are to the serving base station, the lower the maximum transmission power will be set.

As will be described later, after the initial power is determined by the serving base station, ACK/NAK based power control will be applied to the transmitting UE as described in U.S. Pat. Nos. 7,548,760 and 7,515,927, the entire contents of each of which are herein incorporated by reference. The transmitting device-to-device UE measures the CRS from the serving base station. To limit the uplink interference from device-to-device communications, an open loop adjustment could be applied based on a downlink CRS measurement. The higher CRS measurement will lead to a lowering of the maximum transmission power of the transmitting UE by the serving base station, which implies a reduction in the transmission rate of the transmitting UE.

TDD is adopted for direct communications between the UEs. The serving base station configures TDD for the loosely controlled device-to-device link. Upon receiving the status information (BSR, PHR, SRSR) initially from the UEs intending device-to-device communication, the serving base station decides the device-to-device UE TDD transmission duty cycle over the direct communication link and the HARQ configuration.

The first and second UEs track the reference signal from the serving base station and maintain the alignment of their local reference with the reference signal. Since the first and second UEs are very close, as a result, their timing is also aligned.

For device-to-device communications with balanced traffic between the first and second UEs, a 50% duty cycle with the first and second UEs transmitting alternately at 1 ms TDD slots is configured for the first and second UEs. Under the 50% alternate TDD type of device-to-device link, a device-to-device UE is assigned every other slot for TDD transmission even if the UE does not have data to transmit.

In a transmission slot of a device-to-device UE, the UE transmits either data or control signaling (e.g., the ACK/NAK in response to the previous received data from the other UE and CRSR) or both data and control signaling. In general, the procedures of the synchronized HARQ for the uplink of FDD LTE are adopted. The only difference is that the ACK/NAK response is delayed 4 transmission time intervals (TTI) instead of 3 TTI. This is due to the TDD operation of the direct communication link. As with existing downlink control information, the receiving control information is transmitted in the same slot with the associated data.

For device-to-device communications with imbalanced traffic between two UEs, more transmission slots are assigned to the UE with more data to send. For example, 80% of the slots are assigned to the UE with more data to transmit. In a transmission slot of a device-to-device UE, the UE transmits either data or control signaling (e.g., the ACK/NAK in response to the previous received data from the other UE, and CRSR) or both. The UE with less data or no data to transmit uses its transmission slot to transmit the CRSR and ACK/NAK. Due to the imbalanced TDD slot assignment, the bundled HARQ ACK/NAK is sent from the UE with less data to send when the transmit slot of the UE with less data to send becomes available.

For an application with a relaxed delay requirement and balanced traffic from both UEs, the mode with 50% duty cycle and un-bundled HARQ can be selected by the serving base station. For an application with a tight delay requirement and large blocks of data to be transmitted from one UE to the other, a larger TDD duty cycle (e.g. 80%) and bundled HARQ can be selected by the serving base station. For example, most data transmissions such as file transfer and email exchanges are not very sensitive to the delay. While applications such as voice call have a more tight delay requirement.

Resource allocation may refer to the communication resources such frequency spectrum, time, and power. PRBs are two dimensional—frequency sub-carriers and time—blocks allocated to the UEs. Power level is also controlled among the UEs for communications.

Based on the location information of the device-to-device pairs and other UEs being served by the serving base station, different frequency resources may be allocated to the device-to-device pair and the other UEs or to other device-to-device pairs. If the other UEs are far away from the device-to-device pair, the serving base station may not take into account the interference from the other UEs to the device-to-device UEs. If the resource allocation to the other UEs could avoid the resource range allowed for the device-to-device pair, the interference from the loosely controlled device-to-device pair could also be reduced. If the device-to-device UEs' data priority is high, more resources could be allowed by the serving base station. This will reduce the transmission time of the transmitting UE(s).

The serving base station determines a time allowed for the transmitting UE to complete its transmission on the direct communication link based on the size of the buffered data to be transmitted and an average of the resources being used (with the conservative assumption that maximum allowed resource will not always be used).

The serving base station estimates a data transfer rate using the permitted frequency range for accommodating the PRBs and the initial transmission power.

Using the estimated data transfer rate, the serving base station estimates an approximate transfer time for the outstanding data conditioned on a certain allocation of bandwidth and power. More specifically, the serving base station determines the transfer time as:

$$T = B/R = B/(W \cdot \log(1+SNR)) \quad (1)$$

where $$SNR = P/I+N \quad (2)$$

where T is the transfer time, B is the buffered data size, W is the total bandwidth available and P is the transmitted power. The bandwidth W is the bandwidth allowed by the sub-carriers for the allocating PRBs (each sub-carrier is 15 kHz).

At S220, the serving base station transmits configuration messages to the first and second UEs, respectively. The configuration messages start device-to-device communication and indicate the at least one data channel, the at least one control channel, the allocated at least one PRB including an initial transmission power, a maximum transmission power, a maximum frequency range, a TDD transmission duty cycle, a transfer time for direct communication and a HARQ configuration to be used for the direct communication link.

FIG. 3 illustrates the method of offloading communications from the perspective of one of the first and second UEs.

At S300, the method starts. At S305, the first and second UEs receive the configuration messages, respectively, transmitted by the serving base station. When the loosely controlled device-to-device communication is started for the first and second UEs, the first and second UEs transit into a device-to-device mode which is similar to an idle mode to the network. The first and second UEs will continue to track the reference signals and overhead messages from their serving base station as well as neighboring base stations periodically.

At S310, the first and second UEs communicate over the direct communication link using the parameters set forth in the configuration message. The first and second UEs continue to track the reference signals from the serving base station such that they are in-synch with the serving base station.

The first and second UEs continue to monitor a paging channel. If the serving base station receives a page message for one of the first and second UEs and if the page message indicates that it is a low priority page, the serving base station responds with a "busy" message with the reason code of "device-to-device". If the page message indicates that it is a high priority page, the serving base station will page the UE. When a paging message is received, the UE prepares to disable the direct communication and switch back to the normal link with the serving base station.

The first and second UEs continue to transmit the CRS periodically as specified in wireless standards such as LTE.

The first and second UEs will measure each other's CRS and report the CRSR back to each other periodically. If any UE's CRSR measurement is below a threshold, the UE will first try to increase its transmission power. If the transmission power is the maximum transmission power, the UE sends a request to the serving base station and the other UE to terminate the direct communication link and recover the serving base station to UE connection.

Power and rate control can be done by the first and second UEs based on the ACK/NACK feedback from the receiving UE to the sending UE. Initial rate and power can be chosen at the transmitting UE to achieve a SINR. If the receiving UE sends a NACK, the transmitting UE increases its transmission power if possible. If the packet fails repeatedly (e.g., more than a HARQ retransmission target), the transmitting UE determines a lower rate for the next packet transmission.

Power for the ACK/NACK from the receiving UE is determined by the receiving UE based on the device-to-device CRS measurement reported by transmitting UE.

At S315, the method ends. More specifically, after the transmitting UE completes its transmission within the allowed transmission time, the transmitting UE sends a TX_Completed message to the serving base station.

If the serving base station receives the TX_Completed message from both UEs, before the maximum transfer time assigned to the device-to-device communication has expired, the serving base station releases all the resources allocated for the direct communication link to normal base station routed communications.

If, after the maximum time allowed for the device-to-device communication expires, and any of the first and second UEs have not finished their transmission, the first and second UEs transmit a device-to-device request again to the serving base station to request another round of resource arrangement for continuing transmissions on the direct communication link.

During the device-to-device communications when maximum allowed time has not expired, if due to the application change or traffic change, the current device-to-device configuration does not meet at least one of the UE's transmission requirements, the first and/or second UE sends a request to the serving base station to change the configuration (e.g., the TDD and HARQ, as well as the maximum allowed time and resources). The serving base station decides whether to reconfigure the current on-going device-to-device communication based on the status report of one or both of the UEs.

Figure 4:
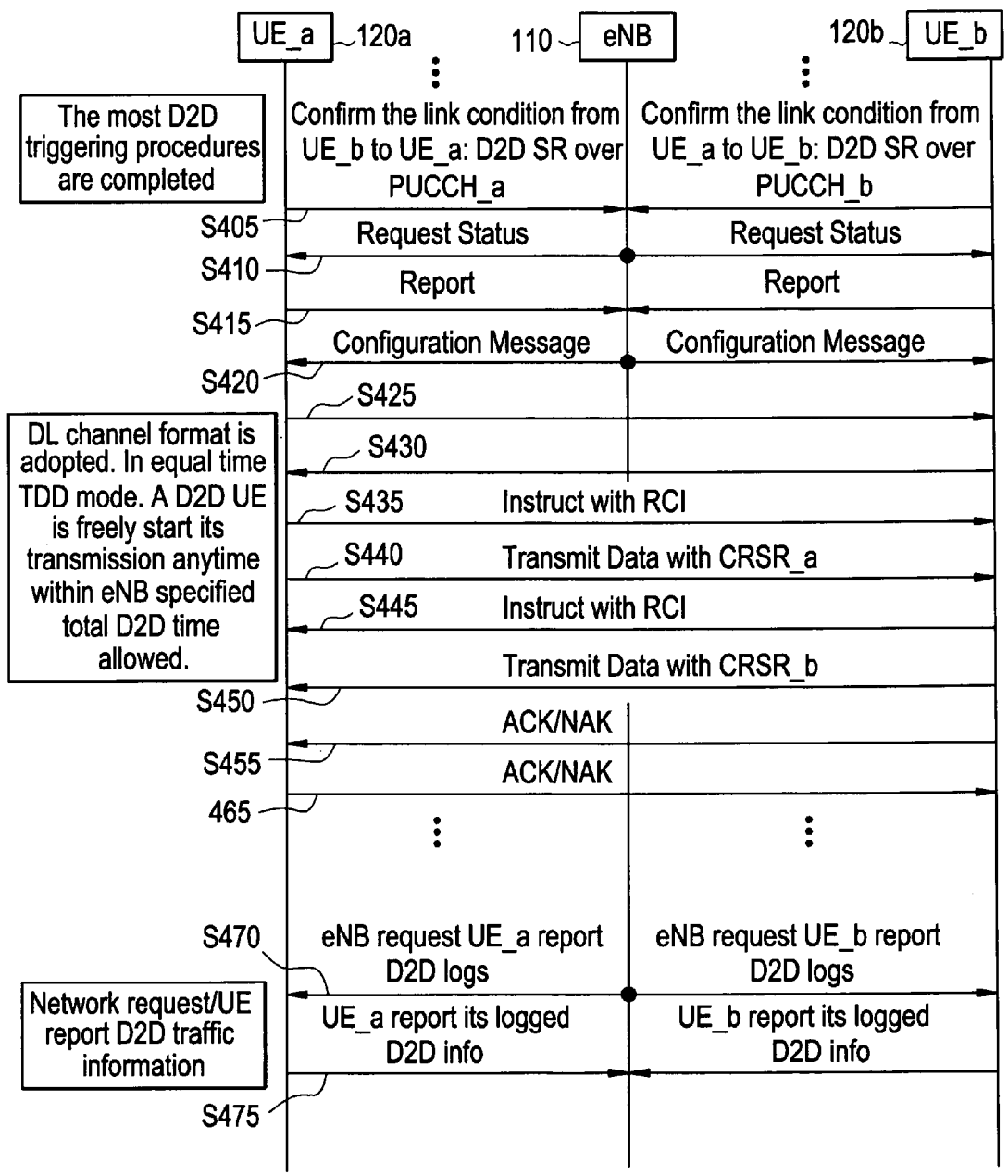

FIG. 4 illustrates a call flow of the method described in FIGS. 2-3, according to an example embodiment. Moreover, FIG. 5 illustrates a system and channel structure of loosely controlled device-to-device communications.

At S405, the UEs measure each other's SRS and determine the link condition between them and current transmitting power. The UEs confirm the direct communication link by sending a device-to-device scheduling request to the serving base station via a physical uplink control channel (PUCCH).

At S410, the serving base station requests status information from the UEs. At S415, the UEs report their BSR, PHR, and SRSR to the serving base station via a physical uplink shared channel (PUSCH). Based on the status of the UEs, the serving base station configures the UEs for device-to-device communications including the TDD and HARQ configurations, initial transmission power, maximum allowed device-to-device time, and maximum allowed resources for device-to-device communication. The serving base station triggers device-to-device communications by transmitting the configuration messages to the UEs, respectively, at S420.

At S425 and S430, the UEs start direct communication in an uplink frequency and downlink channel format. The UEs continue to transmit a reference signal in CRS format as is used for the LTE downlink. As shown in FIG. 5, each of the UEs 120*a* and 120*b* includes a downlink transmitter to transmit information in the downlink channel format. The structure of the UEs 120*a* and 120*b* is described in greater detail below.

At S435, the UE 120*a* instructs the receiving UE 120*b* with receive control information (RCI). The RCI is in the same TTI with the associated data. At S440, the transmitting UE 120*a* transmits device-to-device data plus the CRS measurement report (CRSR_a) to receiving UE 120*b*. It should be understood that S435 and S440 may be performed at the same time slot.

The receiving UE decodes the RCI and then decodes the data before the time ACK/NAK is sent. The timing of received data versus its acknowledgement is determined as discussed above. The overall allowed decoding time period from the data received to the acknowledgment is 4 TTI in the 50% duty cycle case.

At S445, the receiving UE 120*b* schedules for the transmitting UE 120*a* to receive information. At S445, the UE 120*b* transmits RCI for data to be transmitted by the UE 120*b*. At S450, the UE 120*b* transmits device-to-device data plus the CRS measurement report (CRSR_b) to the UE 120*a*. It should be understood that S445 and S450 may be performed at the same time.

At S455, the UE 120*b* acknowledges the status of the received data from the UE 120*a* by sending an ACK/NAK back through a Physical Hybrid-ARQ Indicator Channel (PHICH) in the direct link. At S465, the UE 120*a* acknowledges the status of the received data from the UE 120*b* by sending an ACK/NAK back through the PHICH in the direct link.

At S470, for billing purposes, the serving base station 110 requests the UEs 120*a* and 120*b* to report the data amount transmitted via device-to-device communications. At S475, the UEs 120*a* and 120*b* report the logged device-to-device information.

Figure 6A:
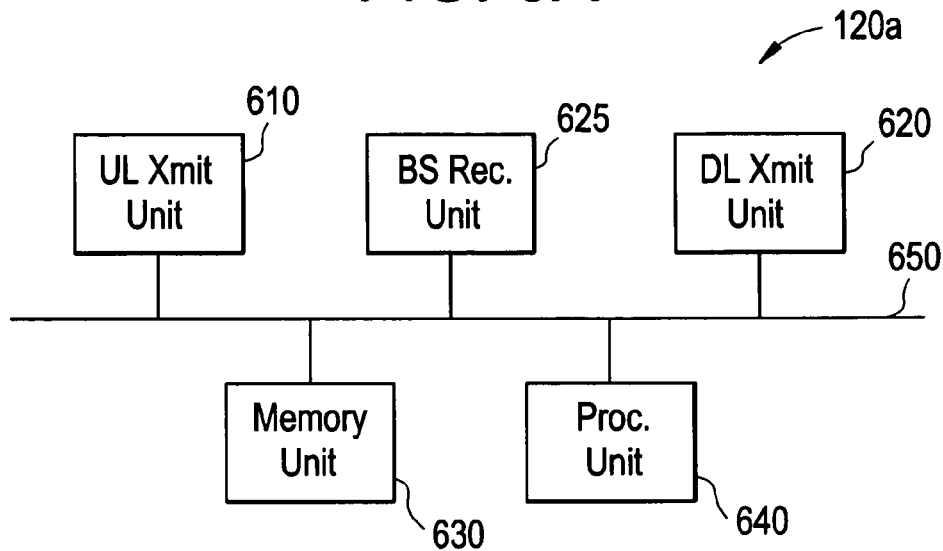
FIG. 6A illustrates an example embodiment of a UE with downlink transmission functionality.

FIG. 6A illustrates an example embodiment of the UE 120*a* with downlink transmission functionality. While only the UE 120*a* is shown, it should be understood that the UE 120*b* may have the same structure. It should be also understood that the UE 120*a* may include features not shown in FIG. 6A and should not be limited to those features that are shown.

The UE 120*a*, shown in FIG. 6A, is configured to receive data from a peer UE (e.g., the UE 120*b*) over an uplink or downlink channel of a network.

The UE 120*a* may include, for example, an uplink transmitting unit 610, a downlink transmitting unit 620, a base station receiving unit 625, a memory unit 630, a processing unit 640, and a data bus 650.

The uplink transmitting unit 610, downlink transmitting unit 620, base station receiving unit 625, memory unit 630, and processing unit 640 may send data to and/or receive data from one another using the data bus 650. The uplink transmitting unit 610 is a device that includes hardware and any necessary software for transmitting wireless signals on the uplink (reverse link) including, for example, data signals, control signals, and signal strength/quality information via one or more wireless connections to other wireless devices (e.g., base stations).

The downlink transmitting unit 620 is a device that includes hardware and any necessary software for transmitting wireless signals on the downlink (forward link) channel including, for example, data signals, control signals, and signal strength/quality information via one or more wireless connections from other wireless devices (e.g., base stations).

The base station receiving unit 625 is implemented as a receiver chain including a low noise amplifier, mixer, filter, and baseband processor configured to receive signals transmitted on an uplink channel. The base station receiving unit 625 is configured to receive device-to-device communications from the UE 120*b* over the direct communications link and receive synchronization reference signals from the base station to maintain synchronization.

The memory unit 630 may be any storage medium capable of storing data including magnetic storage, flash storage, etc.

The processing unit 640 may be any device capable of processing data including, for example, a microprocessor configured to carry out specific operations based on input data, or capable of executing instructions included in computer readable code. For example, the processing unit 640 is configured to determine a transmitting power for communicating with the second UE as described above.

Figure 6B:
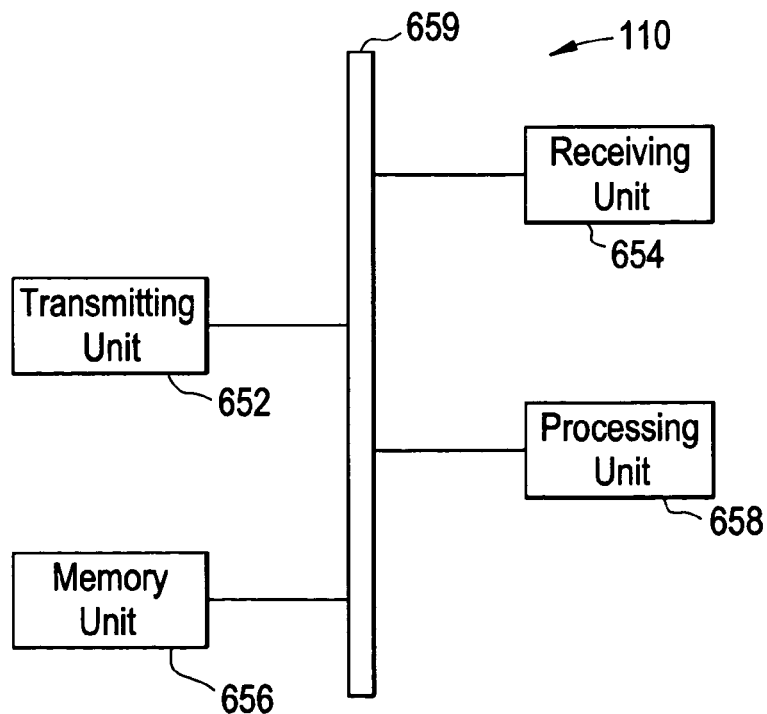

FIG. 6B illustrates an example embodiment of the base station 110. It should be also understood that the base station 110 may include features not shown in FIG. 6B and should not be limited to those features that are shown.

Referring to FIG. 6B, the base station 110 may include, for example, a data bus 659, a transmitting unit 652, a receiving unit 654, a memory unit 656, and a processing unit 658.

The transmitting unit 652, receiving unit 654, memory unit 656, and processing unit 658 may send data to and/or receive data from one another using the data bus 659. The transmitting unit 652 is a device that includes hardware and any necessary software for transmitting wireless signals including, for example, data signals, control signals, and signal strength/quality information via one or more wireless connections to other network elements in the wireless communications network 100. For example, the transmitting unit 652 transmits the configuration messages for the direct communication links 150*a*-150*b* to the UEs 120*a*-120*b*, respectively.

The receiving unit 654 is a device that includes hardware and any necessary software for receiving wireless signals including, for example, data signals, control signals, and signal strength/quality information via one or more wireless connections to other network elements in the network 100.

The memory unit 656 may be any device capable of storing data including magnetic storage, flash storage, etc.

The processing unit 658 may be any device capable of processing data including, for example, a microprocessor configured to carry out specific operations based on input data, or capable of executing instructions included in computer readable code.

For example, the processing unit 658 is configured to at least perform steps S210 and S215 of FIG. 2.

In certain data polling application, a machine-to-machine controller device polls data from more than one device, to minimize the interference between the devices in a system to the controller device. Using FIG. 1 as an example, the eNB 110 assigns the first UE 120*a* to be a controller UE. The first UE 120*a* may poll data from the second UE 120*b* and any other UEs the first UE 120*a* is in direct communication with. The first UE 120*a* requests the UEs to report their respective status in the ACK/NAK slots. The status report includes BSR, PHR, CRSR, BWT (Buffered Waiting Time).

Based on the status reported by the second UE 120*b* and other UEs, the first UE 120*a* decides when to change the device-to-device configurations which include transmission duty cycle of the UEs and the initial device-to-device resource arrangement. The first UE 120*a* may schedule a time slot as the switching point and let the other UEs know beforehand.

As described above, both uplink and downlink control channels between a serving base station and UEs are involved in device-to-device configuration.

The existing PUSCH will be used by the UEs to submit their buffer status report (BSR), Sounding Reference Signal Report (SRSR) or Common Reference Signal Report (CRSR) of the other UE, Power Head Room (PHR), and Buffer Wait Time (BWT), to the serving base station.

The device-to-device configuration and enabling messages are transmitted through existing PDCCHs and PDSCHs. The serving base station transmits network guidance on the initial TX power, maximum TX power, frequency and time range to both transmitting/receiving UEs.

In an example embodiment, if the device-to-device UEs are at the border of the two cells and are served by different base stations, the transmitting request/Status-Info from a first UE will be delivered via PUCCH/PUSCH to its serving base station first and then forwarded to the serving base station of the other UE via X2. The other UE will send accept or deny message back to the serving base station of the first UE. The accept or deny message will finally delivered to the first UE via PDCCH.

The device-to-device data transmission may be over the PDSCH. For power control purpose, the device-to-device UEs measure and report each other's CRS. The each other's CRSR is reported over the PDSCH. The ACK/NAK is send back by the receiving UE over the PHICH. If the transmitting UE holds the PDSCH for data transmission over several device-to-device TDM-slots, bundled HARQ will be used.

Downlink transmission functions of the existing cellular system are added to the UEs.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A method of controlling direct user equipment communications, the method comprising:
    receiving reports from a first user equipment (UE) and a second UE, respectively, the first and second UEs communicating with a serving base station, each report including a buffer status report (BSR), a buffered waiting time report (BWTR), a common reference signal report (CRSR) and a sounding reference signal report (SRSR) for the respective first or second UE;
    determining at least one control channel and at least one data channel for a direct communication link between the first UE and the second UE;
    allocating at least one resource block for the direct communication link between the first UE and the second UE based on the determining;
    determining a time-division duplex (TDD) transmission duty cycle for the direct communication link based on the buffer status report (BSR), the buffered waiting time report (BWTR), the common reference signal report (CRSR) and the sounding reference signal report (SRSR) in the received reports, the determining the TDD duty cycle being a division of the allocated at least one resource block amongst the first UE and the second UE; and
    transmitting a configuration message to the first UE and the second UE, the configuration message indicating the allocated resource block and the determined TDD transmission duty cycle and permitting at least one of the first UE and the second UE to adjust parameters of the direct communication link.

2. The method of claim 1, further comprising:
    receiving requests for direct communication from the first and second UEs, respectively;
    determining that the first UE and the second UE are candidates for direct communication; and
    notifying the first UE and the second UE that the first UE and the second UE are candidates for direction communication based on the determining that the first UE and the second UE are candidates for direct communication, the receiving reports being based on the notifying.

3. The method of claim 1, wherein the allocating at least one resource block allocates at least one of a physical downlink control channel and a physical downlink data channel of the direct communication link.

4. The method of claim 1, further comprising:
    determining whether to utilize a bundled hybrid automatic repeat request configuration or an un-bundled hybrid automatic repeat request configuration for the direct communication link based on the received reports.

5. The method of claim 1, further comprising:
    determining an initial transmitting power for at least one of the first and second UEs on the direct communication link based on the received reports.

6. The method of claim 5, further comprising:
    determining a maximum transmitting power for at least one of the first and second UEs on the direct communication link based on the received reports.

7. The method of claim 1, further comprising:
    determining a time period for the first UE and the second UE to communicate using the at least one resource block.

8. The method of claim 6, wherein the determining a time period determines the time period based on the BSR, a bandwidth available over the direct communication link, a transmission power and transmission rate over the direct communication link.

9. The method of claim 1, wherein the allocating allocates the at least one resource block based on other UEs communicating with the first base station and locations of the other UEs.

10. The method of claim 1, further comprising:
    controlling paging messages for the first UE and the second UE when the first UE and the second UE are engaged in the direct user equipment communications, the controlling being based on priorities of the paging messages, respectively.

11. A base station comprising:
    a receiver configured to receive reports from a first user equipment (UE) and a second UE, respectively, the first and second UEs communicating with the base station, each report including a buffer status report (BSR), a buffered waiting time report (BWTR), a common reference signal report (CRSR) and a sounding reference signal report (SRSR);
    a processor configured to,
        determine at least one control channel and at least one data channel for a direct communication link between the first UE and the second UE,
        allocate at least one resource block for the direct communication link between the first UE and the second UE based on the at least one control channel and the at least one data channel, and
        determine a time-division duplex (TDD) transmission duty cycle for the direct communication link based on the buffer status report (BSR), the buffered waiting time report (BWTR), the common reference signal report (CRSR) and the sounding reference signal report (SRSR), the TDD duty cycle being a division of the allocated at least one resource block amongst the first UE and the second UE; and a transmitter configured to transmit a configuration message to the first UE and the second UE, the configuration message indicating the allocated resource block and the determined TDD transmission duty cycle and permitting at least one of the first UE and the second UE to adjust parameters of the direct communication link.

12. The base station of claim 11, wherein the transmitter is configured to transmit synchronization reference signals to the first and second UEs.

13. A method of controlling direct user equipment communications, the method comprising:

transmitting, by a first user equipment (UE), a report, the report including a buffer status report (BSR), a buffered waiting time report (BWTR), a common reference signal report (CRSR) and a sounding reference signal report (SRSR) for the first UE;

receiving, by the first user equipment (UE), a configuration message, the configuration message indicating at least one allocated resource block for a direct communication link between the first UE and a second UE, a determined time-division duplex (TDD) transmission duty cycle for the device-to-device communications and an initial transmission power based on the buffer status report (BSR), the buffered waiting time report (BWTR), the common reference signal report (CRSR) and the sounding reference signal report (SRSR) for the first UE, and the configuration message permitting at least one of the first UE and the second UE to adjust the initial transmission power and determine a transmission rate of the direct communication link, the TDD duty cycle being a division of the allocated at least one resource block amongst the first UE and the second UE;

transmitting receive control information to the second UE transmitting data to the second UE based on the receive control information using the at least one resource block, the adjusted initial transmission power and the determined rate of information transmission.

14. The method of claim 13, further comprising:
transmitting the data to the second UE with the receive control information.

15. The method of claim 14, further comprising:
receiving an acknowledgement indicating whether the data was transmitted successfully.

16. The method of claim 13, wherein the communicating includes,
transmitting a pilot signal to the second UE,
receiving a response from the second UE, the response indicating a link condition, the adjusted transmission power being based on the link condition.

17. The method of claim 13, further comprising:
transmitting a request to the second UE and at least another UE, the request requesting statuses of the second UE and the at least another UE, respectively;
receiving status reports from the second UE and the at least another UE, respectively; and
determining parameters for communicating with the second UE and the at least another UE based on the received status reports.

18. The method of claim 17, wherein the status reports include a buffer status report (BSR), a buffered waiting time (BWT) and a common reference signal report for the second UE and the at least another UE, respectively.

19. The method of claim 18, wherein the determining parameters schedules transmission time slots for each of the second UE and the at least another UE based on the received status reports.

* * * * *